(12) United States Patent
Schlanger et al.

(10) Patent No.: US 8,923,384 B2
(45) Date of Patent: Dec. 30, 2014

(54) SYSTEM, METHOD AND DEVICE FOR PROCESSING MACROBLOCK VIDEO DATA

(75) Inventors: Erik Schlanger, Austin, TX (US); Rens Ross, Austin, TX (US)

(73) Assignee: Netlogic Microsystems, Inc., Mountain View, CA (US)

( * ) Notice: Subject to any disclaimer, the term of this patent is extended or adjusted under 35 U.S.C. 154(b) by 1127 days.

(21) Appl. No.: 11/967,697

(22) Filed: Dec. 31, 2007

(65) Prior Publication Data

US 2009/0168893 A1 Jul. 2, 2009

(51) Int. Cl.
  H04B 1/66 (2006.01)
  H04N 19/61 (2014.01)
  H04N 19/176 (2014.01)
  H04N 19/436 (2014.01)
  H04N 19/44 (2014.01)

(52) U.S. Cl.
  CPC ... *H04N 19/00521* (2013.01); *H04N 19/00781* (2013.01); *H04N 19/00278* (2013.01); *H04N 19/00533* (2013.01)
  USPC .......................................................... 375/240

(58) Field of Classification Search
  None
  See application file for complete search history.

(56) References Cited

U.S. PATENT DOCUMENTS

| | | | |
|---|---|---|---|
| 5,861,864 A | 1/1999 | Jensen | |
| 6,326,984 B1 | 12/2001 | Chow et al. | |
| 2003/0189982 A1* | 10/2003 | MacInnis | 375/240.24 |
| 2004/0028141 A1 | 2/2004 | Hsiun et al. | |
| 2004/0158878 A1* | 8/2004 | Ratnakar et al. | 725/150 |
| 2006/0165164 A1 | 7/2006 | Kwan et al. | 375/240 |
| 2006/0165181 A1 | 7/2006 | Kwan et al. | 375/240.24 |
| 2007/0153907 A1* | 7/2007 | Mehta et al. | 375/240.24 |
| 2007/0201559 A1* | 8/2007 | He | 375/240.24 |
| 2007/0253491 A1* | 11/2007 | Ito et al. | 375/240.24 |
| 2008/0117973 A1* | 5/2008 | Ramachandran et al. | 375/240.16 |
| 2009/0168899 A1 | 7/2009 | Schlanger et al. | 375/240.26 |
| 2010/0053181 A1 | 3/2010 | Schlanger et al. | 345/531 |
| 2010/0054339 A1 | 3/2010 | Schlanger et al. | 375/240.25 |
| 2010/0111166 A1 | 5/2010 | Schlanger et al. | 375/240.12 |

OTHER PUBLICATIONS

PCT/US2008/087084 International Search Report, Feb. 10, 2009, 4 pages.
U.S. Appl. No. 11/967,690, filed Dec. 31, 2007, entitled "System, Method and Device to Encode and Decode Video Data Having Multiple Video Data Formats".

* cited by examiner

*Primary Examiner* — Kevin C Harper
*Assistant Examiner* — Samina Choudhry
(74) *Attorney, Agent, or Firm* — Sterne Kessler Goldstein & Fox P.L.L.C.

(57) ABSTRACT

In one form, a video processing device (150) includes a memory (110, 130) and a plurality of staged macroblock processing engines (112, 114, 116). The memory (110, 130) is operable to store partially decoded video data decoded from a stream of encoded video data. The plurality of staged macroblock processing engines (112, 114, 116) is coupled to the memory (110, 130) and is responsive to a request to process the partially decoded video data to generate a plurality of macroblocks of decoded video data. In another form, a first a first macroblock of decoded video data having a first location (426) within a first row (408) of a video frame (400) is generated, and a second macroblock of decoded video data having a second location (424) within a second row (410) of the video frame (400) is generated during the generating of the first macroblock.

20 Claims, 4 Drawing Sheets

SYSTEM, METHOD AND DEVICE FOR PROCESSING MACROBLOCK VIDEO DATA

CROSS-REFERENCE TO RELATED APPLICATION(S)

The present application is related to U.S. patent application Ser. No. 11/967,690, entitled "System, Method and Device to Encode and Decode Video Data Having Multiple Video Data Formats," invented by Erik Schlanger, Brendan Donahe, Eric Devolder, Rens Ross, Sandip Ladhani, and Eric Swartzendruber, and filed of even date herewith and assigned to the assignee hereof.

FIELD OF THE DISCLOSURE

The present disclosure relates to video processing and more particularly to a system, method and device for processing macroblock video data.

BACKGROUND

High-definition (HD) video signals typically require a high-definition television or other devices in order to be viewed. With an aspect ratio of 16:9 (1.78:1), HD video approaches current aspect ratios of regular widescreen film recorded at typically 1.85:1 or 2.40:1 (sometimes traditionally quoted at 2.35:1). Standard-definition (SD) video differs from HD video by having an aspect ratio of 4:3 (1.33:1). Numerous video standards and formats have emerged to output HD and SD video. However, each format presents unique characteristics and specifications. As such, decoding and encoding digital video can be limited by processing capabilities of video processing systems to support either one standard or the other.

Moreover HD video requires a significantly greater processing capability than SD because of HD's higher resolution. Video processing is typically carried out on macroblocks. A macroblock is a group of spatially adjacent pixels, usually forming a rectangular block, processed more or less together and somewhat separately from other pixels. An SD video system has a resolution of 720 by 480 pixels at a frame rate of 30 frames per second (fps). Thus for a macroblock having 256 pixels, an SD system requires 1,350 macroblocks to be processed per frame and a total of 40,500 macroblocks to be processed per second. On the other hand, HD has a resolution of 1920 by 1080 pixels, which becomes 1920 by 1088 when rounding 1080 up to the nearest number divisible by 16, and thus for a macroblock of 256 pixels, an HD system requires 8,160 macroblocks to be processed per frame and a total of 244,800 macroblocks to be processed per second. These different processing requirements make it difficult to design a common video processing architecture that will be useful in processing both SD and HD signals and with sufficient processing power for HD systems.

BRIEF DESCRIPTION OF THE DRAWINGS

The present invention will hereinafter be described in conjunction with the following drawing figures, wherein like numerals denote like elements, and.

DETAILED DESCRIPTION

According to one aspect of the present invention, a video processing device includes a memory and a plurality of staged macroblock processing engines. The memory is operable to store partially decoded video data decoded from a stream of encoded video data. The plurality of staged macroblock processing engines is coupled to the memory and is responsive to a request to process the partially decoded video data to generate a plurality of macroblocks of decoded video data.

According to another aspect, a first macroblock of decoded video data having a first location within a first row of a video frame is generated, and a second macroblock of decoded video data having a second location within a second row of the video frame is generated during the generation of the first macroblock.

According to yet another aspect, a video processing system includes a host processor, a multiple format video processing engine, and a memory system. The host processor is operable to detect a request to process a frame of encoded video data. The multiple format video processing engine is coupled to the host processor and responsive thereto to process the frame of encoded video data. The multiple format video processing engine includes a plurality of staged macroblock processing engines that simultaneously processes multiple rows of partially decoded video data and previously generated macroblocks to provide a plurality of macroblocks of decoded video data. The memory system is coupled to the multiple format video processing engine and is responsive thereto to store the partially decoded video data and the previously generated macroblocks.

Figure 1:
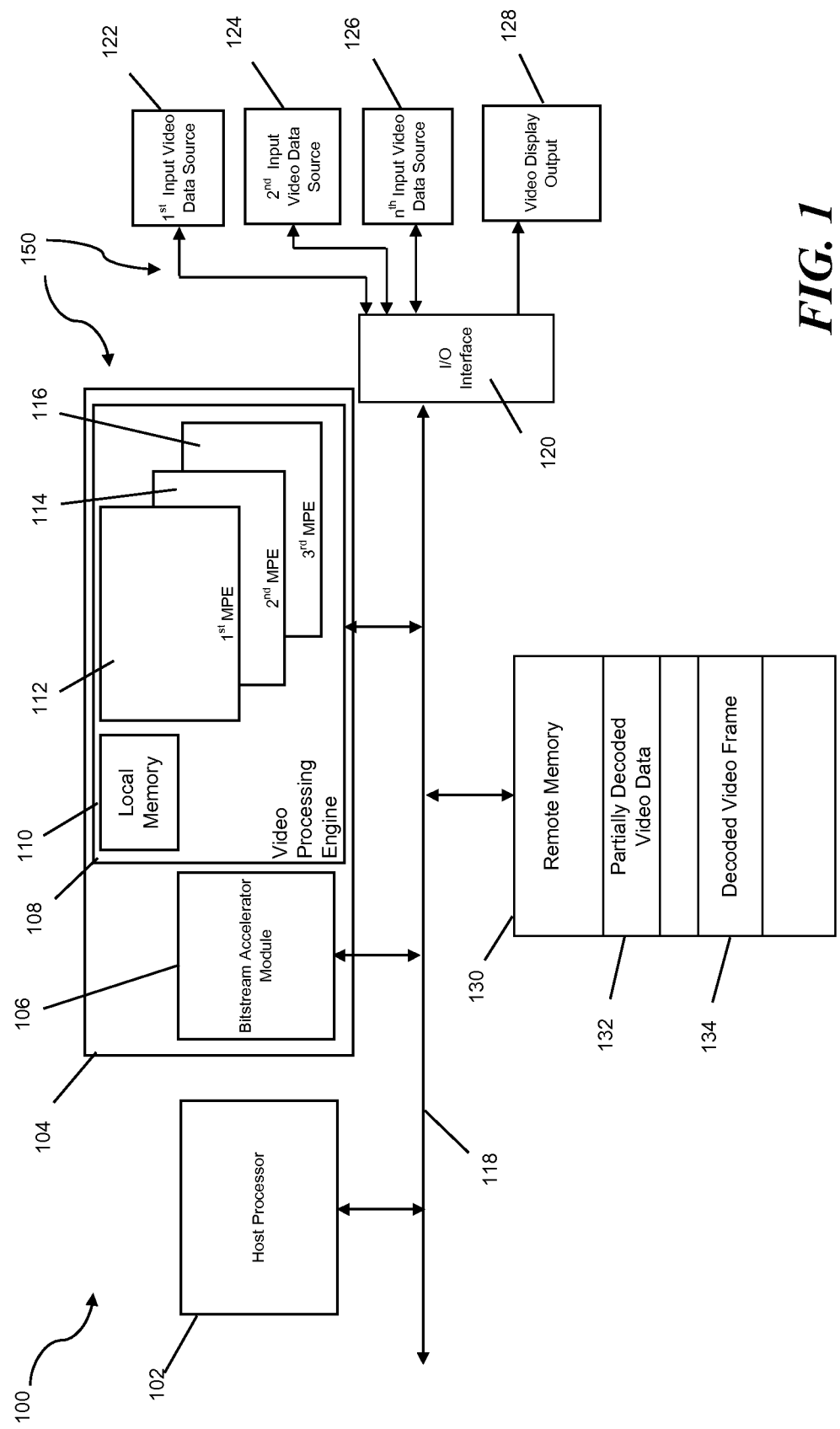
FIG. 1 is a block diagram of a video processing system according to the present invention.

Now turning to the drawings, FIG. 1 is a block diagram of a video processing system 100 according to the present invention. Video processing system 100 can be used as part of a handheld electronic device, computer system, a portable digital video player, a set-top video box, a digital video recorder, a video module or video card, or various other devices or systems, or any combination thereof, that can incorporate all, or portions of, video processing system 100.

Video processing system 100 processes video data in various video and audio formats, including, but not limited to, MPEG ("Moving Pictures Expert Group") 1, 2, and 4, MJPEG ("Motion JPEG"), DV ("Digital Video"), WMV ("Windows Media Video"), RM ("Real Media"), DivX, Sorenson 3, Quicktime 6, RP9, WMV9, Ogg, Ogg Theora, Dirac, H.264, MP3, WMA, or various other formats and coder/decoder specification (codecs). In particular video processing system 100 has an architecture that allows it to efficiently process video data in a variety of different formats, and to perform video processing tasks such as HD decoding efficiently using multiple, staged video processing engines.

Video processing system 100 includes generally a first input video data source 122, a second input video data source 124, and an $n^{th}$ input video data source 126, a video output display 128, a remote memory 130, and a video processing device 150. Each input video data source 122, 124, and 126 can be a different type of video source, such as a digital video disk (DVD), a digital cable signal, a satellite broadcast signal, an Internet Protocol (IP) signal, a hard disk drive (HDD)

storing digital video data, a removable flash drive or various memory modules configured to store digital video data, a digital video recorder, a digital camera including digital video recording capabilities, or various other video sources or combinations of digital video sources.

Video output display 128 is a display device that presents video and/or audio information in a form perceptible to a human, and can be realized with any of a number of display types including cathode ray tube (CRT), liquid crystal display (LCD), plasma display, and the like.

Remote memory 130 is operably connected to video processing device 150. In one form, remote memory 130 is implemented as a Double-Data-Rate Synchronous Dynamic Random Access Memory (DDR SDRAM) module that can be configured in various sizes, and can operate at one or more speeds (e.g. 133 MHz, 266 MHz, etc.). Remote memory 130 can be implemented with other types of memory such as static RAM, asynchronous DRAM, single data rate SDRAM, graphics double data rate (gDDR) SDRAM, and the like. If combined with an integrated memory controller, remote memory 130 is part of a larger memory module that facilitates read and write accesses to various memory locations within the memory. Note that remote memory 130 is "remote" in the sense that it is at a lower level of the memory hierarchy than other memory local to video processing device 150. This feature will be described further below.

Remote memory 130 includes areas for storing data in formats useful for decoding or encoding video data. Briefly, video processing device 150 uses remote memory 130 to store both partially decoded video data and decoded macroblocks for the current video frame. As part of the decoding task, video processing device 150 examines both the partially decoded video data of a current macroblock as well as horizontally and vertically adjacent neighbor macroblocks to recover the video information for the current macroblock. Thus as shown in FIG. 1 remote memory 130 includes a first area 132 for storing partially decoded video data, and a second area 134 for storing a decoded video frame.

Video processing device 150 includes generally a host processor 102, a multiple format video processing engine (MFVPE) 104, a data bus 118, and an input/output (I/O) interface 120. In the illustrated embodiment, all the components of video processing device 150 are combined on a single integrated circuit. In an alternate embodiment, remote memory 130 may also be combined with other elements of video processing device 150 on the same integrated circuit.

Host processor 102 operates as the central processing unit (CPU) of video processing system 100. Host processor 102 is capable of running an operating system and various software applications to control the processing of digital video data using MFVPE 104. In response to a video processing software application, host processor 102 issues requests to MFVPE 104 to process a video data stream according to a selected video format.

Input/output (I/O) interface 120 is operable to connect input video sources 122, 124, and 126 and video output display 128 to data bus 118. I/O interface 120 is configurable to interface data bus 118 with one or more types of communication buses such as a universal serial bus (USB), a USB 2.0 bus, a personal computer interconnect (PCI) bus, a PCI-Express bus, a "FireWire" bus, a digital video bus, an iSCSI bus, and Ethernet, Gigabit Ethernet, or various other communication buses.

MFVPE 104 includes generally a bitstream accelerator module 106 and a video processing engine 108. Bitstream accelerator module 106 and video processing engine 108 are each connected to data bus 118 and are operable to access remote memory 130 and other resources coupled to data bus 118 through I/O interface 120. Application software running on host processor 102 is capable of flexibly using MFVPE 104 to either decode an encoded video data stream, or encode raw video data.

Bitstream accelerator module 106 accelerates the process of bit stream parsing and entropy decode of a video bit stream. Bitstream accelerator module 106 includes its own dedicated processor, separate from host processor 102, which is responsive to firmware corresponding to the selected video format, as well as hardware acceleration circuits for use by the dedicated processor. Bitstream accelerator module 106 includes internal memory for storing different sets of firmware, or "firmwares," corresponding to each supported video format, allowing bitstream accelerator module 106 to be updated from time to time to include revised or new video formats and codecs when available.

Video processing engine 108 includes a local memory 110, a first macroblock processing engine (MPE) 112, a second MPE 114, and a third MPE 116. One or any combination of the MPE's 112, 114, and 116 can be employed to process macroblock data. For example, video processing engine 108 uses only one macroblock processing engine to decode or encode data in the SD format, but uses all three macroblock processing engines to decode data in the HD format. Additionally, video processing engine 108 can utilize two or more additional MPE's as needed or desired to process video data. Video processing engine 108 uses local memory 110 to store a portion of the processed macroblocks of a video frame before finally storing them in remote memory 130.

Generally, processing (decoding or encoding) of video data takes place as follows. Host processor 102 selects the video format and corresponding firmware by writing to a control register of bitstream accelerator module 106. When decoding a stream of encoded video data, bitstream accelerator module 106 reads the data from remote memory 130, partially decodes it, and returns partially decoded video data to remote memory 130. Bitstream accelerator module 106 partially decodes the data by parsing and entropy decoding it. The algorithm for the parsing and entropy decoding operation varies according to the selected video format, and bitstream accelerator module 106 loads firmware that corresponds to the selected video format to control how it processes the encoded video data. To facilitate subsequent use by video processing engine 108, bitstream accelerator module 106 stores the partially decoded data in remote memory 130 in macroblock form.

Video processing engine 108 operates on macroblocks and uses video information from neighbor (i.e. horizontally and vertically adjacent) macroblocks of the current macroblock to recover the video information. In particular video processing engine 108 uses three macroblock processing engines to decode the partially decoded video data efficiently. The multiple macroblock processing engines operate simultaneously to decode adjacent rows of partially decoded video data, and use local memory 110 to temporarily store video data that will be used by one or more adjacent macroblock processing engines. They also operate on macroblocks associated with diagonally adjacent macroblock locations in adjacent rows of the video frame to take advantage of using the previously decoded macroblocks while they are present in local memory 110. By using multiple, staged macroblock processing engines and a memory hierarchy employing both high-speed local memory and slower remote memory, video processing engine 108 reduces overhead that would otherwise be associated with moving neighbor macroblock data to and from main memory. Video processing engine 108 does this by keeping decoded macroblock data at a higher level of the memory hierarchy while it is still needed.

When encoding a stream of raw video data, video processing engine 108 reads the raw video data and encodes it to form partially encoded macroblocks. Bitstream accelerator module 106 reads the partially encoded macroblocks from remote memory 130, entropy encodes them, and outputs a stream of encoded video data to memory 130.

Figure 2:
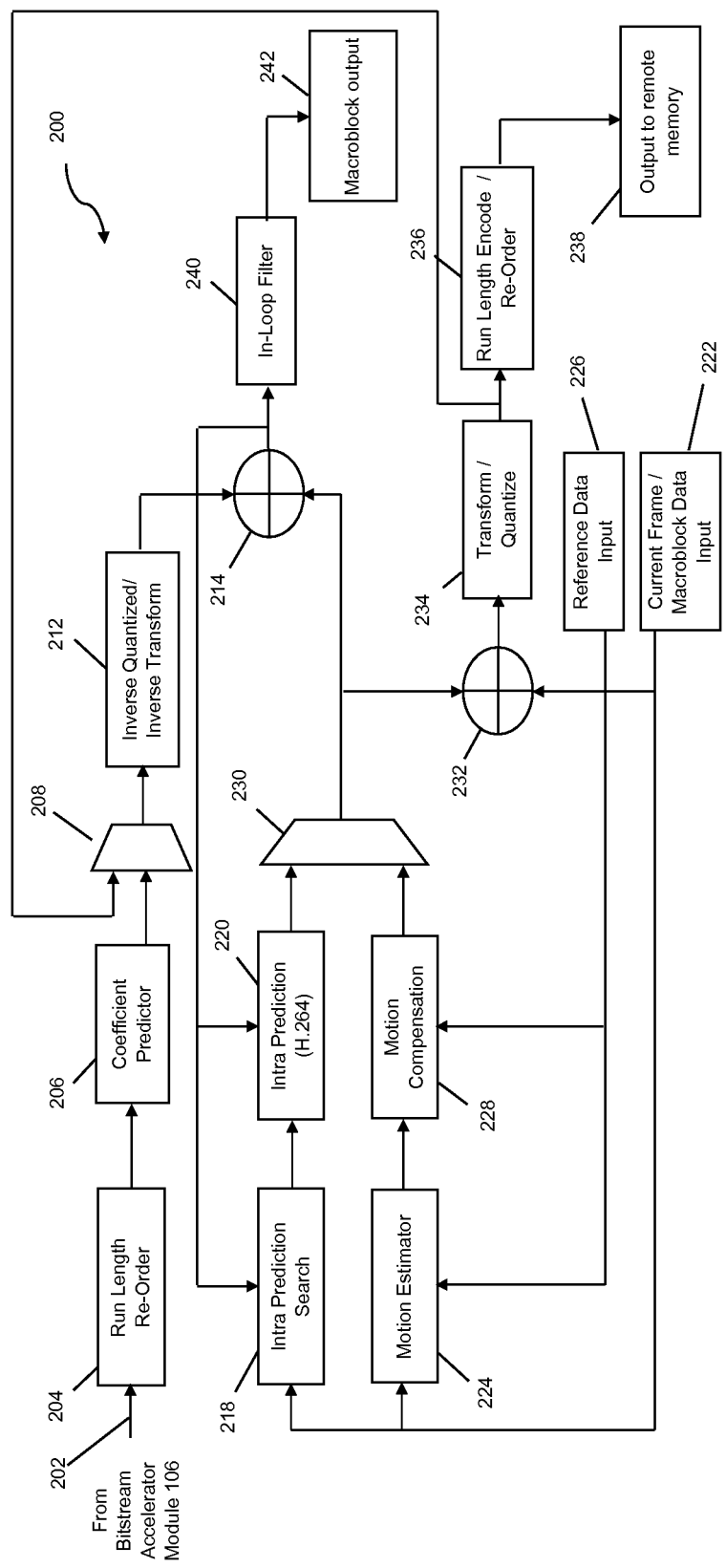
FIG. 2 is a block diagram of a process used by the macroblock processing engines of FIG. 1 to perform decoding and encoding operations.

The operation of each macroblock processing engine can be better understood with reference to FIG. 2, which is a block diagram of a process 200 used by the macroblock processing engines of FIG. 1 to perform decoding and encoding operations. Process 200 may be implemented in hardware, in software or firmware, or in some combination thereof. MPE 200 includes generally a run-length re-order block 204, a coefficient predictor 206, a multiplexer 208, an inverse quantization and transform process 212, a summing device 214, an intra prediction search block 218, an intra prediction (H.264) block 220, a motion estimator 224, a motion compensator 228, a multiplexer 230, a summing device 232, a transform/quantize block 234, and a run length encode/re-order block 236.

Run-length re-order processor 204 has an input for receiving partially decoded video data from bitstream accelerator module 106 of FIG. 1, and an output. Coefficient predictor 206 has an input connected to the output of run length re-order process 204, and an output, and it performs coefficient prediction as needed. Multiplexer 208 has a first input connected to an output of a transform quantize process 234, a second input connected to an output of coefficient predictor 206, and an output. Inverse quantization and transform process 212 has an input connected to the output of multiplexer 208, and an output. Adder 214 has a first input connected to the output of inverse quantization and transform process 212, a second input, and an output. Intra-prediction search block 218 has an input connected to the output of adder 214, a second input connected to the output of summing device 214, and an output. Intra-prediction (H.264) block 218 has an input connected to the output of adder 214, a second input connected to the output of intra prediction search 218, and an output. Motion estimator 224 has a first input coupled to remote memory 130 for receiving a current frame/macroblock, a second input for receiving a reference data input 226, and an output. Motion compensator 228 has a first input coupled to the output of motion estimator 224, a second input for receiving a reference data input 226, and an output. Multiplexer 230 has a first input connected to the output of intra prediction (H.264) block 220, a second input connected to the output of motion compensator 228, and an output connected to the second input of summing device 214. Summing device 232 has a first input connected to the output of multiplexer 232, a second input for receiving a current frame/macroblock, and an output. Transform/quantize block 234 has an input connected to the output of summing device 234, and an output. Run length encode/re-order block 236 has an input connected to the output of transform/quantize block 234, and an output connected to local memory 112. In-loop filter 240 has an input connected to the output of summing device 214, and an output for providing a macroblock output, to local memory 110 or remote memory 130.

Each macroblock processing engine performs the decoding operation of process 200 as follows. As described above bitstream accelerator module 106 of FIG. 1 performs entropy decoding and derives motion vectors to form partially decoded video data. MFVPE 104 uses a direct memory access (DMA) controller to transfer the partially decoded video data to the appropriate macroblock processing engine. The coefficients are run length decoded and re-ordered in block 204. Then coefficient prediction is performed as needed in block 206. Finally the coefficients are inverse quantized and inverse transformed in block 212 to form residuals. Intra macroblock predictions are computed in block 220 for neighbors partially fetched from the memory system. Inter macroblock predictions are computed in block 228 using reference data from neighbor macroblocks fetched from the memory system. Pixels are produced by adding predictions from either the output of block 220 or 228, to the residuals coming from block 212. These pixels are then filtered (for the H.264 and VC-1 formats) in block 240 and output to the memory system. If the macroblocks will be used as reference frames, they are written to local memory 110 for use by another macroblock processing engine. Otherwise, they are written to remote memory 130.

Each macroblock processing engine performs the encoding operation of process 200 as follows. Current macroblock data is transferred, by use of the DMA controller, into blocks 218 and 224. Block 218 performs an intra prediction search using neighbor data. Block 218 passes the chosen mode information to block 220, in which predictions are made. Block 224 performs motion estimation using reference data, and then the chosen macroblock types are passed to block 228, which makes predictions. The difference between the prediction, either intra- or inter-macroblock, and the current macroblock is determined by summing device 232. This difference is then transformed and quantized in block 234. The quantized data is run length encoded and re-ordered in block 236, and written to the memory system in block 238. The reconstructed macroblocks are also used to form reference data. They are fed back into block 212 through multiplexer 208, added to the original prediction in adder 214, filtered in block 240, and written to the memory system to be later used as reference data.

It should be apparent that the particular decoding and encoding operations performed by the macroblock processing engines are specific to the supported video formats and could vary to support new video formats.

Figure 3:
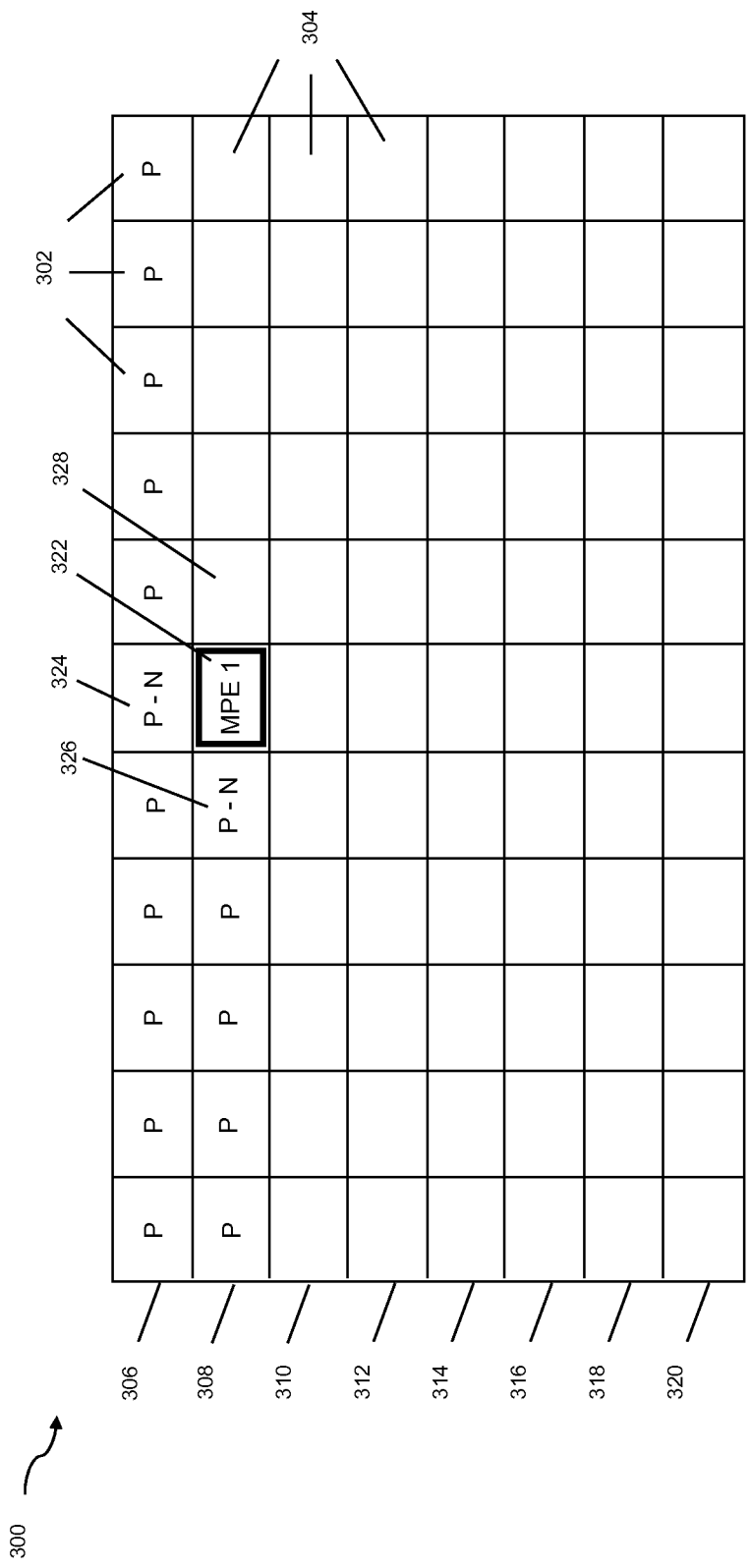
FIG. 3 illustrates a portion of a partially processed video data frame useful in understanding how video processing engine 108 operates when using a single macroblock processing engine.

FIG. 3 illustrates a portion 300 of a partially processed video data frame useful in understanding how video processing engine 108 operates when using a single macroblock processing engine. Portion 300 includes processed macroblocks labeled "P" such as representative processed macroblocks 302, and unprocessed macroblocks illustrated as blank cells such as macroblocks 304. Portion 300 includes a first row of macroblocks 306 that has been previously processed, and a second row of macroblocks 308 that includes both processed and unprocessed (i.e. only partially decoded) macroblocks. Portion 300 also includes additional rows of unprocessed macroblocks 310, 312, 314, 316, 318, and 320. Since each macroblock processing engine operates left to right and top to bottom within a video data frame, it should be apparent that any rows of the complete video data frame at or above row 306 have been previously processed, and all rows at or below row 310 have not yet been processed.

Portion 300 includes a macroblock location 322 that is currently being processed by macroblock processing engine 112, labeled "MPE1," a first neighbor macroblock location 324 labeled "P-N" located adjacent to and above macroblock location 322, and a second neighbor macroblock location 326 also labeled "P-N" located adjacent to and to the left of macroblock location 322. Macroblock processing engine 112 utilizes both the partially decoded video data for the next macroblock of interest as well as the immediately adjacent macroblocks in the vertical and horizontal directions. Note that FIG. 3 shows the macroblocks according to their corresponding locations in the video frame, but they may be stored in memory in an arbitrary location. After macroblock processing engine 112 completes processing macroblock 322, it proceeds to a subsequent macroblock to the right along row 308, namely macroblock 328. After macroblock processing engine 112 completes processing row 308, it begins with the first macroblock at the left side of row 310, and so on until it processes all of the video data frame.

Figure 4:
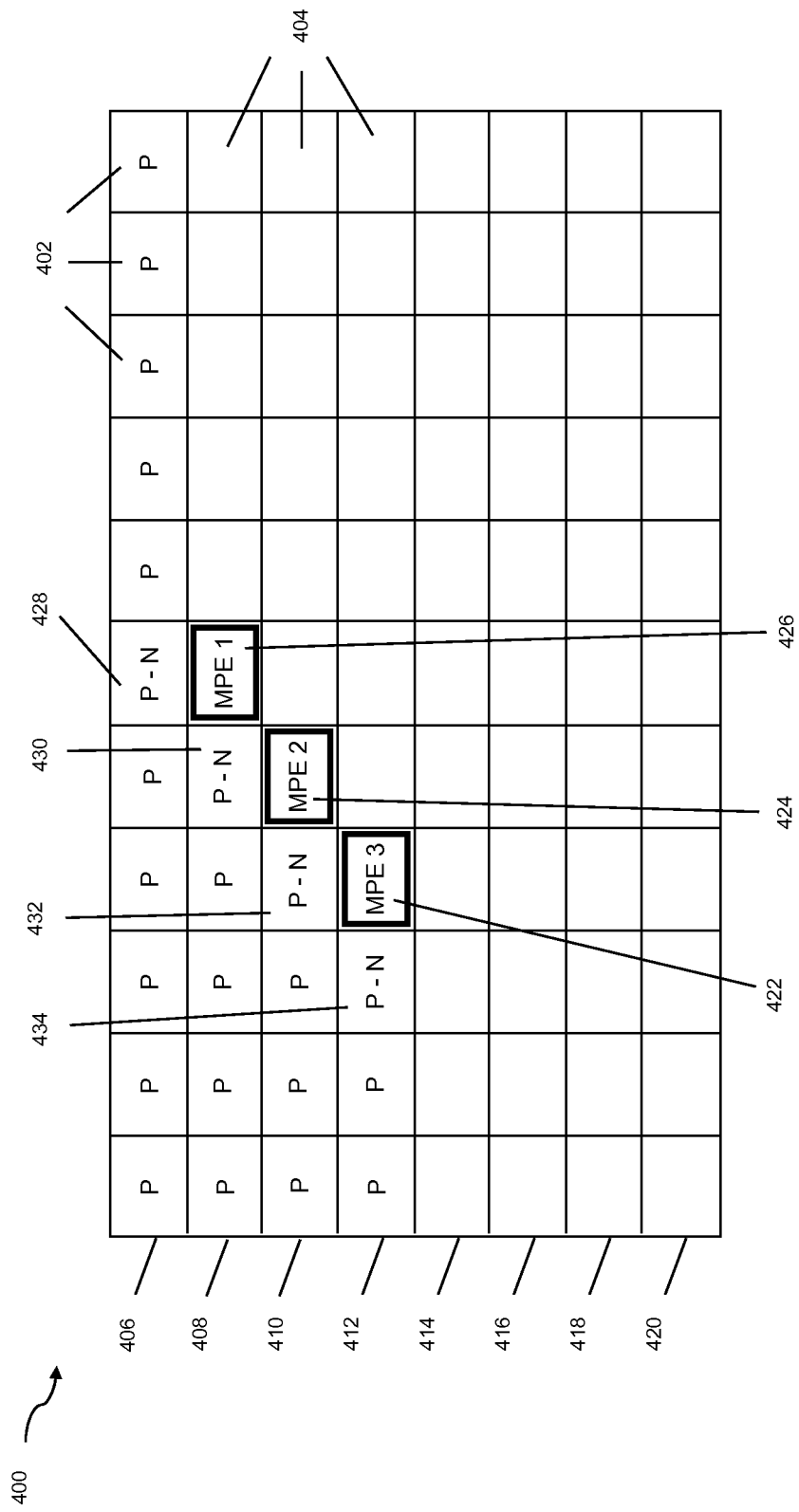
FIG. 4 is a graphical illustration of staged macroblock processing of video data in accordance with a particular aspect of the disclosure.

FIG. 4 illustrates a portion 400 of a partially processed video data frame useful in understanding how video processing engine 108 uses multiple staged macroblock processing engines. Portion 400 includes processed macroblocks labeled "P" such as representative processed macroblocks 402, and unprocessed macroblocks illustrated as blank cells such as macroblocks 404. Portion 400 includes a first row of macroblocks 506 that has been previously processed, and rows of macroblocks 408, 410, and 412 that include both processed and unprocessed (i.e. partially decoded) macroblocks. Portion 400 also includes additional rows of macroblocks 414, 416, 418, and 420. Since each macroblock processing engine operates left to right and top to bottom within a video data frame, it should be apparent that all macroblocks in rows of the complete video data frame at or above row 406 have been previously processed, and all macroblocks in rows at or below row 414 have not yet been processed.

Portion 400 also includes a macroblock location 426 that is currently being processed by macroblock processing engine 112, labeled "MPE 1," a second macroblock location 424 that is currently being processed by macroblock processing engine 114, labeled "MPE 2," and a third macroblock location 422 that is currently being processed by macroblock processing engine 116, labeled "MPE 3". Video processing engine 108 processes each macroblock location 422, 424, 426 simultaneously using both the partially decoded video data for the corresponding location, and neighbor macroblocks to that location. In particular macroblock processing engine 112 accesses neighbor macroblocks corresponding to locations 428 and 430, macroblock processing engine 114 accesses neighbor macroblocks corresponding to locations 430 and 432, and macroblock processing engine 116 accesses neighbor macroblocks corresponding to locations 432 and 434.

Macroblock processing engines 112, 114, and 116 are "staged" in that they simultaneously decode macroblock data corresponding to locations in the video data frame that are spaced apart at intervals. The particular interval used by video processing engine 108 is one row below and one row to the left. Thus macroblock processing engine 114 decodes a macroblock having a location in the video data frame that is one row below and one column to the left of the location currently being processed by macroblock processing engine 112. Likewise macroblock processing engine 116 decodes a macroblock having a location in the video data frame that is one row below and one column to the left of the location being processed by macroblock processing engine 114. Moreover, the macroblock processing engines start processing macroblocks in their assigned rows at in particular columns at successively later times, and so in this respect they are also staged. In alternate embodiments that use more than three macroblock processing engines, the additional macroblock processing engines would follow the same pattern of staging.

By using multiple staged macroblock processing engines, video processing device 150 is able to store recently decoded macroblocks in local memory 110 from which they can be accessed by another macroblock processing engine soon thereafter without having to access remote memory 130. Thus video processing device 150 saves the overhead of moving the decoded macroblock into and out of remote memory 130. Moreover the other macroblock processing engine is able to access the recently decoded macroblock from local memory 110 faster than from remote memory 130, because local memory 110 is at a higher level of the memory hierarchy. Using multiple staged macroblock processing engines also meets the higher demands of HD decoding while video processing device 150 operates at speeds attainable in today's integrated circuit manufacturing processes.

Once the macroblock is no longer needed soon by any of the staged macroblock processing engines, video processing device 108 moves it to the decoded video frame area in remote memory 130. For example, macroblock 522 will not be needed again for a considerable amount of time. Thus, video processing device 108 stores it in remote memory 130. When macroblock processing engine 112 later needs it as a neighbor macroblock while processing macroblocks for row 514, video processing device 108 reads it from remote memory 130.

In other embodiments, the staging intervals could be altered to fit more complex decoding schemes. For example, the first macroblock processing engine could access multiple neighbor macroblocks in the prior row. In this example, the staged macroblock processing engines would be staged at longer intervals, such as separated by two macroblocks. Video processing engine 108 would use a wider window for storing macroblocks in local memory 110. The wider window would be useful when using macroblock processing engines that do not process neighbor data as precisely the same time.

While the invention has been described in the context of a preferred embodiment, various modifications will be apparent to those skilled in the art. For example, when using three macroblock processing engines to process HD video data, it may be necessary for video processing device 150 to incorporate another host processor like host processor 102 to perform additional processing tasks. Accordingly, it is intended by the appended claims to cover all modifications of the invention that fall within the true scope of the invention.

What is claimed is:

1. A video processing device comprising:
    a memory to store partially decoded video data decoded from a stream of encoded video; and
    a plurality of staged macroblock processing engines coupled to the memory and responsive to a request to process the partially decoded video data to generate a plurality of macroblocks of decoded video data, in which a different number of the plurality of staged macroblock processing engines is selectable to generate the plurality of macroblocks based at least in part upon a processing power requirement of the plurality of staged macroblock processing engines to process the stream of encoded video data, wherein the processing power requirement is based on a format of the stream of encoded video data.

2. The video processing device of claim 1, wherein the plurality of staged macroblock processing engines includes:
    a first macroblock processing engine to process a first row of partially decoded video data;
    a second macroblock processing engine to process a second row of partially decoded video data, wherein the second row of partially decoded video data is adjacent to the first row of partially decoded video data and
    a third macroblock processing engine to process a third row of partially decoded video data, wherein the third row of partially decoded video data is adjacent to the second row of partially decoded video data.

3. The video processing device of claim 2, wherein:
    the first macroblock processing engine is to generate a first macroblock having a first location within the first row of partially decoded video data; the second macroblock processing engine is to generate a second macroblock having a second location within the second row of partially decoded video data, wherein the second location is aligned diagonally to the first location; and the third macroblock processing engine is to process a third macroblock having a third location within the third row of partially decoded video data, Wherein the third location is aligned diagonally to the first location and the second location.

4. The video processing device of claim 1, wherein the plurality of staged macroblock processing engines includes:

a first macroblock processing engine to generate a first macroblock using a first neighbor macroblock generated by a third macroblock processing engine;

a second macroblock processing engine to generate a second macroblock using a second neighbor macroblock generated by the first macroblock processing engine; and the third macroblock processing engine to generate a third macroblock using a third neighbor macroblock generated by the second macroblock processing engine.

5. The video processing device of claim 4, wherein the memory comprises a local memory and a remote memory, and wherein:

the first neighbor macroblock is stored within the remote memory after the first macroblock processing engine uses the first neighbor macroblock;

the second neighbor macroblock is stored within the local memory after the second macroblock processing engine uses the second neighbor macroblock; and the third neighbor macroblock is stored within the local memory after the third macroblock processing engine uses the third neighbor macroblock.

6. The video processing device of claim 4, wherein:

the first macroblock processing engine is to initiate storing the first macroblock within a local memory in response to completing processing;

the second macroblock processing engine is to initiate storing the second macroblock within the local memory in response to completing processing; and the third macroblock processing engine is to initiate storing the third macroblock within a remote memory in response to completing processing.

7. The video processing device of claim 4, wherein:

the first macroblock processing engine is to process a first row of partially decoded video data to generate a first plurality of decoded macroblocks;

the second macroblock processing engine is to process a second row of partially decoded video data to generate a second plurality of decoded macroblocks; and the third macroblock processing engine is to process a third row of partially decoded video data to generate a third plurality of decoded macroblocks.

8. The video processing device of claim 1 wherein the plurality of staged macroblock processing engines comprises:

a first macroblock processing engine to process partially decoded video data to generate a first plurality of decoded macroblocks for a first row of a video frame;

a second macroblock processing engine to process partially decoded video data including the first plurality of decoded macroblocks to generate a second plurality of decoded macroblocks for a second row of the video frame, the second macroblock processing engine to initiate processing of the partially decoded video data including the first plurality of decoded macroblocks at a first period later than the first macroblock processing engine initiates processing of the first row of partially decoded video data.

9. A method of processing video data comprising:

generating a first macroblock of decoded video data having a first location within a first row of a video frame; and generating a second macroblock of decoded video data having a second location within a second row of the video frame during the generating of the first macroblock, in which a different number of a plurality of staged macroblock processing engines is selectable to generate the first and second macroblocks based at least in part upon a processing power requirement of the plurality of staged macroblock processing engines to process the video data, wherein the processing power requirement is based on a format of the video data.

10. The method of claim 9, wherein the generating of the first macroblock comprises:

reading a first neighbor macroblock having a location in the video frame above the first location, the location of the first neighbor macroblock being in a row above the first row of the video frame;

reading a second neighbor macroblock having a location in the video frame adjacent to the first location within the first row of the video frame; and generating the first macroblock using the first neighbor macroblock and the second neighbor macroblock.

11. The method of claim 10, wherein:

the reading of the firs neighbor macroblock comprises reading the first neighbor macroblock from a remote memory; and the reading of the second neighbor macroblock comprises reading the second neighbor macroblock from a local memory.

12. The method of claim 10, wherein the generating of the second macroblock of decoded video data includes:

reading the second neighbor macroblock from a local memory;

reading a third neighbor macroblock having a location in the video frame adjacent to the second location from the local memory; and generating the second macroblock using the second neighbor macroblock and the third neighbor macroblock.

13. The method of claim 9, further comprising:

generating a third macroblock of decoded video data having a third location within a third row of the video frame during the generating of the first macroblock and the generating of the second macroblock.

14. The method of claim 13, further comprising:

reading the third neighbor macroblock from a local memory;

reading a fourth neighbor macroblock having a location in the video frame adjacent the third location from the local memory; and generating the third macroblock using the third neighbor macroblock and the fourth neighbor macroblock.

15. The method of claim 14, further comprising: writing the first and second macroblocks to the local memory; and writing the third macroblock to a remote memory.

16. The method of claim 9, further comprising:

generating a plurality of additional macroblocks of decoded video data in the first row of the video frame while generating a plurality of additional macroblocks of decoded video data in the second row of the video frame.

17. A video processing system comprising:
- a host processor to detect a request to process a frame of encoded video data;
- a multiple format video processing engine coupled to the host processor and responsive thereto to process the frame of encoded video data, wherein the multiple format video processing engine comprises a plurality of staged macroblock processing engines that simultaneously processes multiple rows of partially decoded video data and previously generated macroblocks to provide a plurality of macroblocks of decoded video data, in which a different number of the plurality of the staged macroblock processing, engines is selectable to provide the plurality of macroblocks based at least in part upon a processing power requirement of the plurality of staged macroblock processing engines to process the encoded video data, wherein the processing power requirement is based on a format of the frame of encoded video data; and
- a memory system coupled to the multiple format video processing engine and responsive thereto to store the partially decoded video data and the previously generated macroblocks.

18. The video processing system of claim 17, wherein the plurality of staged macroblock processing engines comprises:
- a first macroblock processing engine to process a first row of partially decoded video data;
- a second macroblock processing engine to process a second row of partially decoded video data, wherein the second row of partially decoded video data is adjacent to the first row of partially decoded video data; and
- a third macroblock processing engine to process a third row of partially decoded video data, wherein the third row of partially decoded video data is adjacent to the second row of partially decoded video data.

19. The video processing system of claim 18, wherein the memory system comprises:
- a local memory; and
- a remote memory, wherein the remote memory is to store the partially decoded video data and the local memory is to store a portion of the previously generated macroblocks.

20. The video processing system of claim 18, wherein the multiple format video processing engine further comprises a bitstream accelerator module coupled to the host processor and responsive thereto and to a stream of encoded video data to provide the multiple rows of partially decoded video data.

* * * * *

UNITED STATES PATENT AND TRADEMARK OFFICE
CERTIFICATE OF CORRECTION

| | | |
|---|---|---|
| PATENT NO. | : 8,923,384 B2 | Page 1 of 1 |
| APPLICATION NO. | : 11/967697 | |
| DATED | : December 30, 2014 | |
| INVENTOR(S) | : Schlanger et al. | |

It is certified that error appears in the above-identified patent and that said Letters Patent is hereby corrected as shown below:

Title Page, Item (57), Abstract, please replace "a first a first" with --a first--.

In the Claims

Column 8, line 59, claim 2, please replace "data and" with --data; and--.

Column 9, line 8, claim 3, please replace "Wherein" with --wherein--.

Column 10, line 30, claim 11, please replace "firs" with --first--.

Column 11, line 13, claim 17, please replace "processing, engines" with --processing engines--.

Signed and Sealed this
Fifth Day of May, 2015

Michelle K. Lee
*Director of the United States Patent and Trademark Office*